(12) United States Patent
Matsumoto

(10) Patent No.: US 8,123,018 B2
(45) Date of Patent: Feb. 28, 2012

(54) POWER TRANSMITTING DEVICE

(75) Inventor: Akio Matsumoto, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 831 days.

(21) Appl. No.: 12/171,582

(22) Filed: Jul. 11, 2008

(65) Prior Publication Data

US 2009/0014271 A1   Jan. 15, 2009

(30) Foreign Application Priority Data

Jul. 13, 2007   (JP) ................... 2007-184663

(51) Int. Cl.
*B60K 17/34* (2006.01)
(52) U.S. Cl. ............... 192/110 B; 192/115; 384/493; 384/557
(58) Field of Classification Search .............. 192/84.7
See application file for complete search history.

(56) References Cited

U.S. PATENT DOCUMENTS 4,398,774 A * 8/1983 Voll et al. ............. 384/493
(Continued)

FOREIGN PATENT DOCUMENTS

JP         4-341650 A   * 11/1992
(Continued)

*Primary Examiner* — Rodney Bonck
(74) *Attorney, Agent, or Firm* — Oblon, Spivak, McClelland, Maier & Neustadt, L.L.P.

(57) ABSTRACT

A power transmitting device includes a front housing member, an inner shaft, and a main clutch that selectively permits and shuts off transmission of torque between the front housing member and the inner shaft. The power transmitting device is rotatably supported by a bearing arranged outside the front housing member. An intermediate member having a thermal expansion coefficient lower than the thermal expansion coefficient of the front housing member is arranged between the front housing member and the bearing.

12 Claims, 2 Drawing Sheets

U.S. PATENT DOCUMENTS

| | | | |
|---|---|---|---|
| 4,473,309 A * | 9/1984 | Box | 384/905 |
| 5,044,908 A * | 9/1991 | Kawade | 384/557 |
| 5,073,039 A * | 12/1991 | Shervington | 384/493 |
| 6,092,638 A * | 7/2000 | Vatsaas | 192/85.41 |
| 7,063,193 B2 * | 6/2006 | Yoshida | 192/35 |

FOREIGN PATENT DOCUMENTS

| | | |
|---|---|---|
| JP | 2641762 | 8/1997 |
| JP | 10-292827 | 11/1998 |
| JP | 11-303898 | 11/1999 |
| JP | 2006-342941 A * | 12/2006 |

* cited by examiner

Axial Direction

POWER TRANSMITTING DEVICE

CROSS-REFERENCE TO RELATED APPLICATIONS

This application is based on and claims priority from Japanese Patent Application No. 2007-184663 filed on Jul. 13, 2007, the entire contents of which are incorporated herein by reference.

BACKGROUND OF THE INVENTION

The present invention relates to a power transmitting device.

Power transmitting devices of known configuration include a type that has a cylindrical first rotor, which receives driving force and rotates, and a shaft-like second rotor, which is coaxial with and rotatably arranged in the first rotor. A clutch mechanism is located between the first rotor and the second rotor, and selectively permits and shuts off torque transmission between the first rotor and the second rotor. The power transmitting device is arranged in, for example, a power transmission path to auxiliary drive wheels of a four-wheel-drive vehicle and controls transmission of the power to the auxiliary drive wheels. The clutch mechanism is formed by an electromagnetic clutch operated by an electromagnet. Mainly to prevent decrease of transmitted torque caused by leakage of magnetic flux, a front housing member, which is the first rotor, is formed of non-magnetic material such as an aluminum alloy (see, for example, Japanese Laid-Open Patent Publication No. 10-292827).

Generally, a power transmitting device is rotatably supported by a ball bearing arranged outside the front housing member. To improve the wear resistance, the ball bearing has an inner race and an outer race that are formed of iron based material such as high-carbon chromium steel. The inner race and the outer race normally exhibit a thermal expansion coefficient lower than the thermal expansion coefficient of the front housing member. Thus, if the power transmitting device is heated by friction heat produced by the clutch mechanism, the front housing member thermally expands to deform and expand the inner race in a radially outward direction, reducing the size of the clearance in the ball bearing. This generates excessively great friction in the ball bearing, thus shortening the life of the ball bearing or causing a seizure of the ball bearing. To solve this problem, conventionally, the clearance in the ball bearing is set to a comparatively large size. However, preload needs to be applied to the ball bearing in order to suppress noise caused by such large-sized clearance. That is, the large-sized clearance in the ball bearing complicates the manufacturing steps and raises the costs. In this regard, the conventional power transmitting device is yet to be improved.

SUMMARY OF THE INVENTION

Accordingly, it is an objective of the present invention to provide a power transmitting device that suppresses excessively great friction in the interior of a bearing when the power transmitting device is heated.

To achieve the foregoing objective and in accordance with a first aspect of the present invention, a power transmitting device including a first rotor having a cylindrical shape, a second rotor having a shaft-like shape, a clutch mechanism, and a relaxation member is provided. The second rotor is provided inside the first rotor to be rotatable relative to and coaxial with the first rotor. The clutch mechanism selectively permits and shuts off transmission of torque between the first rotor and the second rotor. The power transmitting device is rotatably supported by a bearing arranged outside the first rotor. The relaxation member is provided between the first rotor and the bearing The relaxation member relaxes a stress applied to the bearing in a radially outward direction by thermal expansion of the first rotor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 4.

Figure 1:
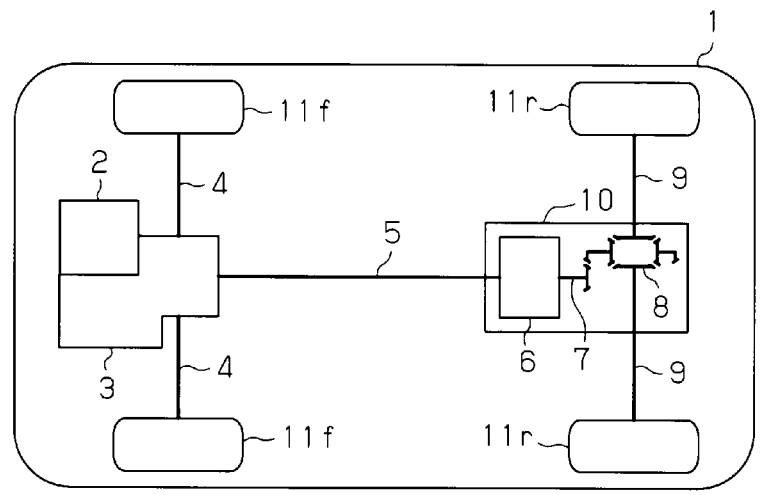
FIG. 1 is a diagram showing a vehicle equipped with a power transmitting device according to one embodiment of the present invention.

FIG. 1 shows a four-wheel-drive vehicle 1 that is normally operated through driving of the front wheels. An engine 2 is mounted in a front portion (a left portion as viewed in the drawing) of the vehicle 1. A transaxle 3 is secured to the engine 2, with a pair of front axles 4 extending from the transaxle 3. A propeller shaft 5, or a driveshaft, also extends from the transaxle 3. The propeller shaft 5 is connected to a pinion shaft (a drive pinion shaft) 7 through a power transmitting device 6. The pinion shaft 7 is connected to a pair of rear axles 9 through a rear differential 8. The power transmitting device 6, the pinion shaft 7, and the rear differential 8 are accommodated in a differential carrier 10.

This configuration transmits torque produced by the engine 2 from the transaxle 3 to front wheels 11$f$ through the front axles 4 and to rear wheels 11$r$ through the propeller shaft 5, the power transmitting device 6, the rear differential 8, and the rear axles 9.

Figure 2:
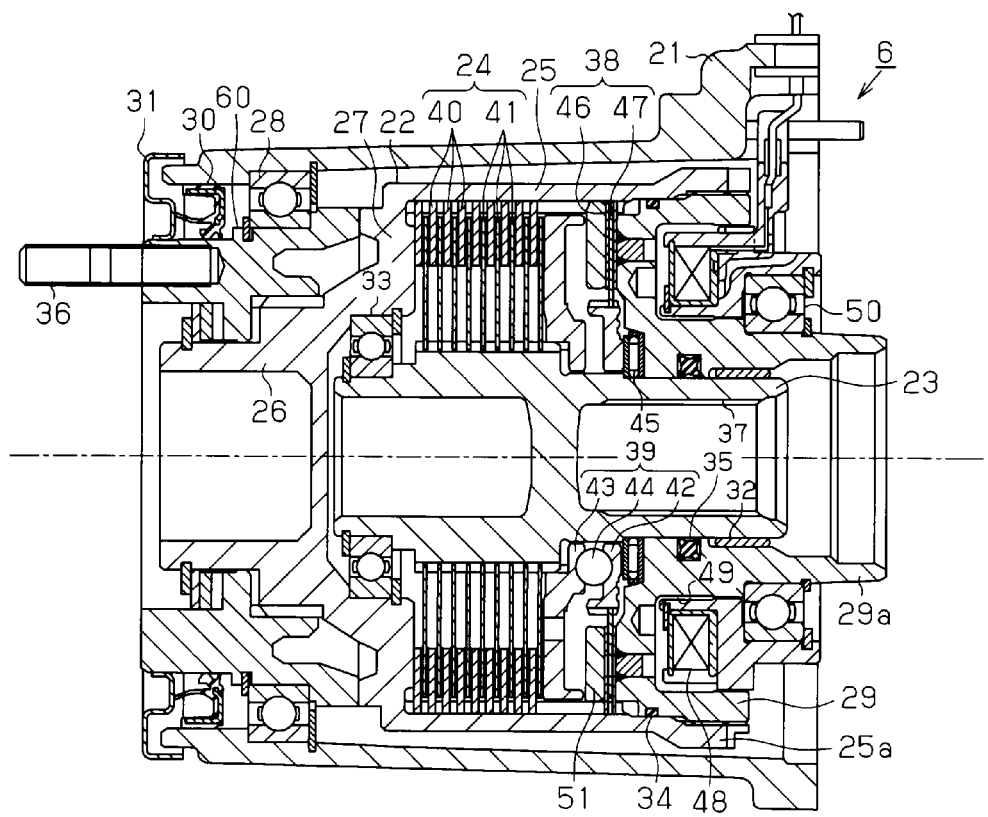
FIG. 2 is a cross-sectional view illustrating the power transmitting device shown in FIG. 1.

As shown in FIG. 2, the power transmitting device 6 is rotatably received in a cylindrical coupling case 21, which is arranged in the differential carrier 10. The power transmitting device 6 includes a cylindrical front housing member 22 having a bottom 27, an inner shaft 23, and a main clutch 24 serving as a clutch mechanism. The front housing member 22 is formed of an aluminum alloy, which is a non-magnetic material. The inner shaft 23 is provided in the front housing member 22 rotatably relative to and coaxially with the front housing member 22. The main clutch 24 connects the front housing member 22 to the inner shaft 23 in such a manner that torque is transmitted between the front housing member 22 and the inner shaft 23. In other words, the main clutch 24 selectively permits and shuts off the transmission of torque between the front housing member 22 and the inner shaft 23.

The front housing member 22, or a first rotor, includes a large diameter cylindrical portion 25 and a small diameter cylindrical portion 26 having a diameter smaller than the diameter of the large diameter cylindrical portion 25. The bottom 27 of the front housing member 22 is located between the large diameter cylindrical portion 25 and the small diameter cylindrical portion 26 and connects the cylindrical portions 25, 26 together. The main clutch 24 is arranged inside the large diameter cylindrical portion 25.

An intermediate member 60, or relaxation means (a relaxation member), is provided outside the small diameter cylindrical portion 26. The intermediate member 60 rotates integrally with the front housing member 22. A ball bearing 28 is arranged between the intermediate member 60 and the coupling case 21, supporting the intermediate member 60 rotatably relative to the coupling case 21. In other words, the front housing member 22 is supported by the ball bearing 28 to be rotatable relative to the coupling case 21. The ball bearing 28 is formed of high-carbon chromium steel (SUJ2). An annular rear housing member 29 is fitted in an open end 25a (the right end as viewed in FIG. 2) of the large diameter cylindrical portion 25.

The gap between the intermediate member 60 and the coupling case 21 is blocked by an annular cover member 31 at an open end (the left end as viewed in FIG. 2) of the coupling case 21. A lip seal 30, or a sealing member, is fixed to the inner circumferential surface of the coupling case 21. The cover member 31 and the lip seal 30 prevent foreign objects such as sand from entering from the exterior through the gap between the intermediate member 60 and the coupling case 21.

The inner shaft 23, or a second rotor, is supported rotatably by a needle bearing 32 arranged inside the rear housing member 29 and a ball bearing 33 provided at the center of the bottom 27. A sealing member 34 is fitted in a portion at which the rear housing member 29 is engaged with the front housing member 22. A sealing member 35 is provided between the inner circumferential surface of the rear housing member 29 and the outer circumferential surface of the inner shaft 23. The sealing members 34, 35 prevent leakage of lubricant oil from inside the large diameter cylindrical portion 25 of the front housing member 22.

The front housing member 22 is connected to the propeller shaft 5 by fastening the intermediate member 60 to a non-illustrated flange formed in the propeller shaft 5 using a bolt 36. This allows the front housing member 22 to be rotated by receiving the torque generated by the engine 2, or the drive source. A spline engagement portion 37, which functions as a connecting portion with respect to the pinion shaft 7, is formed on the inner surface of the end (the right end as viewed in FIG. 2) of the inner shaft 23 supported by the needle bearing 32. The front housing member 22 is thus connected to the front wheels 11f, which are main drive wheels. Further, the inner shaft 23 is connected to the rear wheels 11r, which are auxiliary drive wheels.

A pilot clutch 38 is arranged inside the large diameter cylindrical portion 25. The pilot clutch 38 is arranged adjacent to the main clutch 24 along the axial direction of the front housing member 22 such that the pilot clutch 38 is located closer to the rear housing member 29 than the main clutch 24 with respect to the axial direction of the front housing member 22. A cam mechanism 39 is arranged between the main clutch 24 and the pilot clutch 38.

The main clutch 24 is a multi-plate friction clutch having a plurality of outer clutch plates 40 and inner clutch plates 41 alternately arranged along the axial direction of the front housing member 22. The outer clutch plates 40 are engaged with the inner circumferential surface of the front housing member 22 by means of splines. Each of the outer clutch plates 40 is movable in the axial direction of the front housing member 22 and rotates integrally with the front housing member 22. The inner clutch plates 41 are engaged with the outer circumferential surface of the inner shaft 23 by means of splines. Each of the inner clutch plates 41 is movable in the axial direction of the front housing member 22 and rotates integrally with the inner shaft 23. When the main clutch 24 is pressed along the axial direction of the front housing member 22, each adjacent pair of the outer clutch plates 40 and the inner clutch plates 41 are frictionally engaged with each other, which permits the torque transmission between the front housing member 22 and the inner shaft 23.

The cam mechanism 39 includes an annular pilot cam 42, an annular main cam 43, and ball members 44 located between the pilot cam 42 and the main cam 43. The pilot cam 42 is rotatable relative to the inner shaft 23. The main cam 43 is engaged with the outer circumferential surface of the inner shaft 23 by means of splines. The main cam 43 is movable in the axial direction of the front housing member 22 and rotates integrally with the inner shaft 23. The surface of the pilot cam 42 opposite to the surface facing the main cam 43 is held in contact with a needle bearing 45, which is arranged between the pilot clutch 38 and the rear housing member 29. This supports the pilot cam 42 at a position spaced from the rear housing member 29 by a certain distance and to be rotatable relative to the rear housing member 29.

V-shaped grooves are formed on surfaces of the pilot cam 42 and the main cam 43 that face each other. The ball members 44 are normally held between the pilot cam 42 and the main cam 43 in such a manner that each ball member 44 is located in a facing pair of the V-shaped grooves of the pilot cam 42 and the main cam 43. When the pilot cam 42 and the main cam 43 rotate relative to each other in this state, the pilot cam 42 and the main cam 43 separate from each other. That is, the main cam 43 moves toward the main clutch 24 along the axial direction of the front housing member 22. This causes the main cam 43 to press the main clutch 24 in the axial direction of the front housing member 22.

Like the main clutch 24, the pilot clutch 38 is a multi-plate friction clutch having a plurality of outer clutch plates 46 and inner clutch plates 47 alternately arranged along the axial direction of the front housing member 22. The outer clutch plates 46 are engaged with the inner circumferential surface of the front housing member 22 by means of splines. Each of the outer clutch plates 46 is movable in the axial direction of the front housing member 22 and rotates integrally with the front housing member 22. The inner clutch plates 47 are engaged with the outer circumferential surface of the pilot cam 42 by means of splines. Each of the inner clutch plates 47 is movable in the axial direction of the front housing member 22 and rotates integrally with the pilot cam 42. When the pilot clutch 38 is pressed along the axial direction of the front housing member 22, each adjacent pair of the outer clutch plates 46 and the inner clutch plates 47 are frictionally engaged with each other, which permits the torque transmission between the front housing member 22 and the pilot cam 42.

Therefore, when the pilot clutch 38 is disengaged, that is, when the torque transmission between the front housing member 22 and the pilot cam 42 is shut off, the pilot cam 42 rotates integrally with the main cam 43, that is, with the inner shaft 23. Thus, a rotational difference is generated between the front housing member 22 and the pilot cam 42, which corresponds to the rotational difference between the front housing member 22 and the inner shaft 23. On the other hand, when the pilot clutch 38 is engaged, that is, when the torque transmission between the front housing member 22 and the pilot cam 42 is permitted, torque based on the rotational difference between the front housing member 22 and the inner shaft 23 (the pilot cam 42) is transmitted to the cam mechanism 39.

When transmitted to the cam mechanism 39, the torque based on the rotational difference between the front housing member 22 and the inner shaft 23 generates a rotational difference between the pilot cam 42 and the main cam 43 in the cam mechanism 39. Based on this rotational difference, the main cam 43 moves toward the main clutch 24 along the axial direction of the front housing member 22. That is, the cam mechanism 39 converts the torque based on the rotational difference between the front housing member 22 and the inner shaft 23 transmitted through the pilot clutch 38 into a linear motion of the main cam 43 along the axial direction of the front housing member 22, and amplifies the linear motion. The main clutch 24 is pressed by the main cam 43, which moves linearly, and is thus engaged, which permits torque transmission between the front housing member 22 and the inner shaft 23.

The pilot clutch 38 is driven by an electromagnet 48. That is, the pilot clutch is an electromagnetic clutch. An annular groove 49 is formed in the rear housing member 29. The annular groove 49 has an opening that faces the outside of the front housing member 22 (rightward as viewed in FIG. 2). The electromagnet 48 is accommodated in the annular groove 49. A cylindrical portion 29a extends from a center of the rear housing member 29 toward the outside of the front housing member 22. The electromagnet 48 is rotatably supported by a ball bearing 50 located in the cylindrical portion 29a to be rotatable relative to the rear housing member 29 (and the front housing member 22).

An annular armature 51 is arranged in the front housing member 22. The pilot clutch 38 is clamped between the armature 51 and the rear housing member 29. The armature 51 is engaged with the inner circumferential surface of the front housing member 22 by means of splines. The armature 51 is movable in the axial direction of the front housing member 22, and rotates integrally with the front housing member 22. Frictional engagement between each adjacent pair of the outer clutch plates 46 and the inner clutch plates 47 of the pilot clutch 38 is caused when the armature 51 is attracted by the electromagnet 48 and presses the pilot clutch 38 along the axial direction of the front housing member 22.

In this manner, the operation of the pilot clutch 38 of the power transmitting device 6 is controlled through supply of electricity to the electromagnet 48. In accordance with the operation of the pilot clutch 38, the operation of the main clutch 24 is controlled in such a manner that the torque transmission between the front housing member 22 and the inner shaft 23 is selectively permitted and shut off.

The intermediate member 60 will hereafter be explained in detail.

The intermediate member 60, which is provided between the front housing member 22 and the ball bearing 28, is formed of a material having a thermal expansion coefficient lower than the thermal expansion coefficient of the material forming the front housing member 22. Specifically, if the front housing member 22 is formed of an aluminum alloy as in the illustrated embodiment, the intermediate member 60 is formed of an iron-based metal such as carbon steel (S45C).

Figure 3:
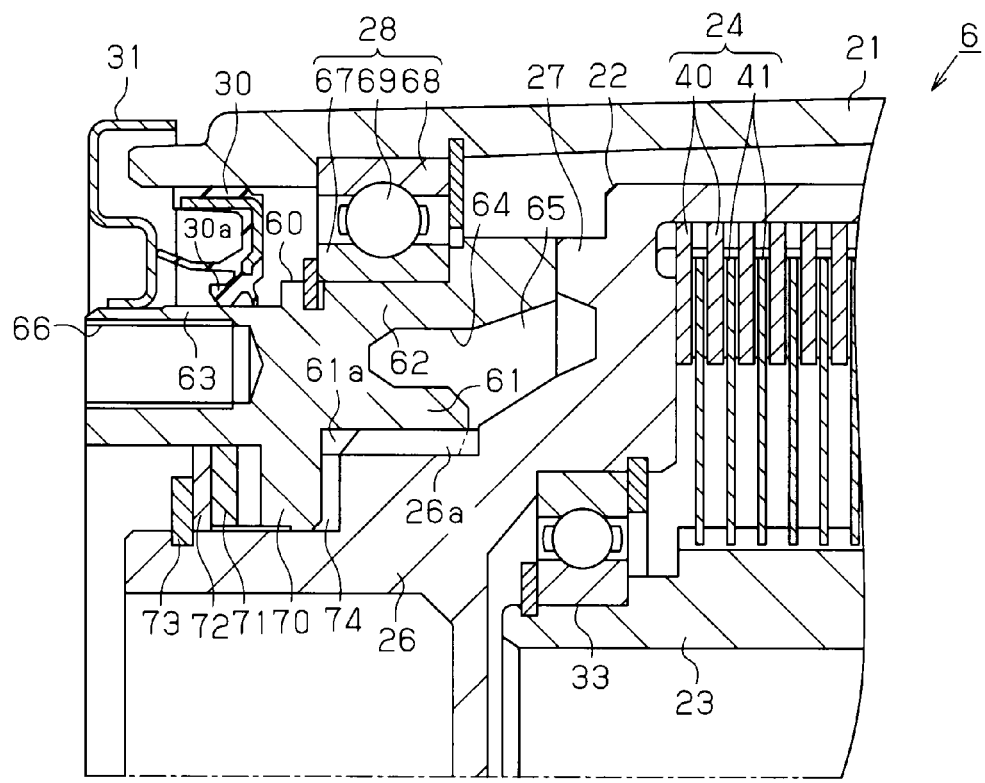
FIG. 3 is an enlarged cross-sectional view illustrating the power transmitting device shown in FIG. 1.
Figure 4:
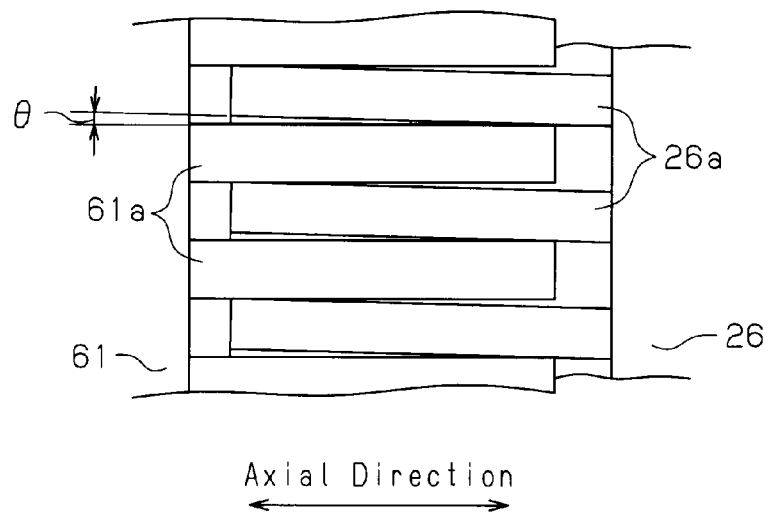
FIG. 4 is a view schematically showing a portion of an intermediate member of the power transmitting device shown in FIG. 1 engaged with a front housing member of the power transmitting device, as viewed along a radial direction of the power transmitting device.

As shown in FIG. 3, an engagement portion 61 engaged with the outer circumferential surface of the small diameter cylindrical portion 26 is provided in an inner circumferential portion of an end of the annular intermediate member 60 near the front housing member 22. A securing portion 62 to which the ball bearing 28 is secured (in other words, the securing portion 62 is supported by the ball bearing 28) is formed in an outer circumferential portion of the same end of the intermediate member 60. An annular groove 64, which extends along the entire circumference of the intermediate member 60, is formed between the engagement portion 61 and the securing portion 62. The annular groove 64 thus defines a hollow portion 65, which is located at a position radially inward from the securing portion 62. A slidable contact portion 63, which the lip seal 30 slidably contacts, is provided in an outer circumferential portion of an end of the intermediate member 60 opposite to the front housing member 22. An insertion hole 66, or a connecting portion in which the bolt 36 is received, is defined in an inner circumferential portion of the same end of the intermediate member 60.

The ball bearing 28 includes an inner race 67, an outer race 68, and ball members 69. The inner race 67 is fitted around the securing portion 62 and the outer race 68 is provided outward from the inner race 67. The ball members 69 are arranged between the inner race 67 and the outer race 68 and roll in this state.

Engagement of the engagement portion 61 with the outer circumferential surface of the small diameter cylindrical portion 26 allows the intermediate member 60 to rotate integrally with the front housing member 22. Specifically, with reference to FIG. 4, the engagement portion 61 has splines 61a extending in the axial direction of the intermediate member 60. Also, splines 26a are formed on the outer circumferential surface of the small diameter cylindrical portion 26 and inclined at a predetermined angle θ with respect to the axial direction of the front housing member 22. In the illustrated embodiment, the angle θ0 is set to approximately several tens of arcminutes. Each of the splines 61a of the intermediate member 60 is press fitted between the corresponding adjacent pair of the splines 26a of the front housing member 22. This connects the intermediate member 60 to the front housing member 22 in such a manner that the intermediate member 60 and the front housing member 22 rotate integrally with each other.

As shown in FIG. 3, a flange 70 projects radially inward from an axial middle portion of the intermediate member 60. A wave washer 71 serving as an elastic member and a ring 72 are fixed to the flange 70 by a snap ring 73, which is provided on an outer circumferential portion of the distal end of the small diameter cylindrical portion 26. This causes the wave washer 71 to press the intermediate member 60 toward the front housing member 22 along the axial direction of the power transmitting device 6. The end of the intermediate member 60 near the front housing member 22 thus contacts the bottom 27 of the front housing member 22. In this state, a clearance 74 is formed between the flange 70 and the small diameter cylindrical portion 26.

A radial lip 30a of the lip seal 30 slidably contacts the slidable contact portion 63. The cover member 31 is secured to the distal end of the slidable contact portion 63. The surface of the slidable contact portion 63 is hardened through high-frequency hardening, or hardening through high-frequency induction heating followed by rapid cooling.

As the torque produced by the engine 2 is input to the propeller shaft 5, the front housing member 22 rotates. When the front housing member 22 rotates, the power transmitting device 6 (the front housing member 22) may be heated mainly by the heat generated through the friction between the outer clutch plate 40 and the inner clutch plate 41.

The thermal expansion coefficient of the front housing member 22 is not equal with the thermal expansion coefficient of the ball bearing 28. Thus, if the ball bearing 28 is arranged directly outside the front housing member 22 without the intermediate member 60 arranged between the ball bearing 28 and the front housing member 22, thermal expansion of the front housing member 22, which is heated, applies stress to the ball bearing 28 in a radially outward direction. This deforms the inner race 67 and decreases the size of the clearance in the ball bearing 28. As a result, excessively great friction occurs between the inner race 67 and the ball member 69, causing seizure of the ball bearing 28.

However, in the illustrated embodiment, the intermediate member 60 is provided between the front housing member 22 and the ball bearing 28. The thermal expansion coefficient of the intermediate member 60 is lower than the thermal expansion coefficient of the front housing member 22. Thus, even if the front housing member 22 and the intermediate member 60 are heated, the stress applied to the ball bearing 28 in the radially outward direction, which is caused by the thermal expansion of the front housing member 22, is relaxed. This makes it unnecessary to increase the size of the clearance in the ball bearing 28 in order to prevent the seizure of the ball bearing 28, which is caused by the thermal expansion of the front housing member 22. In other words, since the size of the clearance in the ball bearing 28 is not increased, it is unnecessary to apply preload to the ball bearing 28 so as to prevent noise caused by the increased size of the clearance. This simplifies the manufacturing steps and reduces the costs.

Further, the hollow portion 65 is provided in the intermediate member 60 at a position radially inward from the securing portion 62. The hollow portion 65 absorbs the thermal expansion of the front housing member 22 in the radially outward direction. This further relaxes the stress applied to the ball bearing 28 by the thermal expansion of the front housing member 22 in the radially outward direction. Also, the diameter of the small diameter cylindrical portion 26, which is the portion of the front housing member 22 by which the ball bearing 28 is supported, is smaller than the diameter of the large diameter cylindrical portion 25. Thus, increase of the volume of the small diameter cylindrical portion 26 caused by the thermal expansion of the front housing member 22 is smaller than increase of the volume of the large diameter cylindrical portion 25. This also relaxes the stress applied to the ball bearing 28 in the radially outward direction, which is caused by the thermal expansion of the front housing member 22.

The splines 26a of the small diameter cylindrical portion 26 are inclined at the predetermined angle θ with respect to the axial direction of the front housing member 22. Each of the splines 61a of the intermediate member 60 is press fitted between the corresponding adjacent pair of the splines 26a of the small diameter cylindrical portion 26. As a result, the front housing member 22 and the intermediate member 60 are coupled together firmly in the circumferential direction.

In addition to the engagement between the front housing member 22 and the intermediate member 60 by means of splines, the clearance 74 is provided between the small diameter cylindrical portion 26 and the flange 70. The clearance 74 thus absorbs the thermal expansion of the front housing member 22 in the axial direction. Such thermal expansion of the front housing member 22 is absorbed also by elastic deformation of the wave washer 71, which presses the intermediate member 60 toward the front housing member 22.

The illustrated embodiment has the following advantages.

(1) The intermediate member 60, which has the thermal expansion coefficient lower than that of the front housing member 22, is provided between the front housing member 22 and the ball bearing 28. Thus, if the power transmitting device 6 is heated to such a point at which the front housing member 22 thermally expands, the stress thus applied to the inner race 67 of the ball bearing 28 in the radially outward direction is relaxed by the intermediate member 60. This prevents the clearance between the inner race 67 and the ball member 69 from being reduced in size due to deformation of the inner race 67 in the radially outward direction. Also, excessively great friction in the ball bearing 28 is suppressed. Further, since it is unnecessary to increase the size of the clearance in the ball bearing 28, it is also unnecessary to apply preload to the ball bearing 28 in order to prevent noise generation caused by the increased size of the clearance. This simplifies the manufacturing steps and saves the costs.

(2) The intermediate member 60 has the hollow portion 65, which is provided at a position radially inward from the securing portion 62. The hollow portion 65 thus absorbs thermal expansion of the front housing member 22 in the radially outward direction. This further relaxes the stress applied to the ball bearing 28 by the thermal expansion of the front housing member 22 in the radially outward direction.

(3) The diameter of the small diameter cylindrical portion 26, or the portion of the front housing member 22 by which the ball bearing 28 is supported, is smaller than the diameter of the large diameter cylindrical portion 25. The increase amount of the volume of the small diameter cylindrical portion 26 due to thermal expansion is thus less than that of the large diameter cylindrical portion 25. This also relaxes the stress applied to the ball bearing 28 by the thermal expansion of the front housing member 22 in the radially outward direction. Further, since the intermediate member 60 is provided around the outer circumference of the small diameter cylindrical portion 26, not the large diameter cylindrical portion 25, the size of the power transmitting device 6 is advantageously reduced.

(4) The splines 26a of the small diameter cylindrical portion 26 are inclined at the predetermined angle θ with respect to the axial direction of the front housing member 22. Each of the splines 61a of the intermediate member 60 is press fitted between the corresponding adjacent pair of the splines 26a of the small diameter cylindrical portion 26. The front housing member 22 and the intermediate member 60 are thus coupled together firmly in the circumferential direction. This prevents the bolt 36 from loosening due to unstable coupling between the front housing member 22 and the intermediate member 60.

(5) The clearance 74 between the small diameter cylindrical portion 26 and the flange 70 absorbs the thermal expansion of the front housing member 22 in the axial direction. This prevents an excessively great stress from being caused in the front housing member 22 and the intermediate member 60.

(6) The thermal expansion of the front housing member 22 in the axial direction is absorbed also by the elastic deformation of the wave washer 71, which presses the intermediate member 60 toward the front housing member 22. This also prevents generation of an excessively great stress in the front housing member 22 and the intermediate member 60.

(7) The surface of the slidable contact portion 63 of the intermediate member 60 is hardened through high-frequency hardening so that the surface becomes sufficiently hard for tolerating slidable contact with the lip seal 30. If the front housing member 22 is formed of an aluminum alloy, it is necessary to secure, for example, a protective member formed of stainless steel to the portion of the front housing member 22 that the lip seal 30 slidably contacts. However, in the illustrated embodiment, such protective member is not needed. This reduces the number of the components and the number of the manufacturing steps.

(8) The portion of the power transmitting device 6 connected to the propeller shaft 5 is not the front housing member 22 formed of an aluminum alloy but the intermediate member 60 formed of carbon steel, or iron based metal. Thus, the bolt 36, which fastens the propeller shaft 5 and the power transmitting device 6 together, may be comparatively short. This contributes to reduction of the axial dimension of the power transmitting device 6.

The illustrated embodiment may be modified as follows.

In the illustrated embodiment, the annular groove 64 extending along the entire circumference of the intermediate member 60 is provided between the engagement portion 61 and the securing portion 62. The annular groove 64 defines the hollow portion 65 at the position radially inward from the securing portion 62. However, the annular groove 64 may be replaced by recesses that are defined between the engagement portion 61 and the securing portion 62 and spaced at predetermined angular intervals in the circumferential direction of the intermediate member 60. In this case, the hollow portions defined by the recesses are located at positions radially inward from the securing portion 62.

The method for hardening the surface of the slidable contact portion 63 is not restricted to the high-frequency hardening but may be any other suitable method. Further, instead of hardening the surface of the slidable contact portion 63, a protective member formed of stainless steel, for example, may be arranged outside the slidable contact portion 63. In this case, the protective member contacts the lip seal 30 that slides on the slidable contact portion 63.

As long as the thermal expansion coefficient of the intermediate member 60 is lower than the thermal expansion coefficient of the front housing member 22, the intermediate member 60 may be formed of any suitable material other than carbon steel. However, it is preferred that the thermal expansion coefficient of the intermediate member 60 be equal or close to the thermal expansion coefficient of the inner race 67 of the ball bearing 28. If the thermal expansion coefficient of the intermediate member 60 is equal or close to the thermal expansion coefficient of the inner race 67, the intermediate member 60 expands to an extent similar to the extent to which the inner race 67 expands. Thus, compared to a case in which the thermal expansion coefficient of the intermediate member 60 is equal or close to the thermal expansion coefficient of the front housing member 22, the stress applied to the ball bearing 28 by the thermal expansion of the front housing member 22 in the radially outward direction is further effectively relaxed.

The splines 26a of the front housing member 22 may extend along the axial direction of the front housing member 22, instead of being inclined at the predetermined angle θ with respect to the axial direction of the front housing member 22. In this case, the splines 61a of the intermediate member 60 may be inclined at a predetermined angle with respect to the axial direction of the intermediate member 60, instead of extending along the axial direction of the intermediate member 60. Engagement between the intermediate member 60 and the front housing member 22 by means of splines ensures improved torque transmission efficiency. Further, since such engagement allows the intermediate member 60 to move axially relative to the front housing member 22, the clearance 74 between the small diameter cylindrical portion 26 and the flange 70 effectively absorbs the thermal expansion of the front housing member 22 in the axial direction.

The intermediate member 60 and the front housing member 22 do not necessarily have to be engaged with each other by means of the splines. For example, the splines 61a may be replaced by projections provided in the engagement portion 61 of the intermediate member 60. In this case, recesses engageable with the projections are formed in the outer circumferential surface of the front housing member 22. Alternatively, recesses may be provided in the engagement portion 61 with projections engageable with the recesses formed on the outer circumferential surface of the front housing member 22.

The outline shape of the engagement portion 61 of the intermediate member 60 is not restricted to the cylindrical shape. The engagement portion 61 may be formed by, for example, a plurality of claws extending in the axial direction of the intermediate member 60 and spaced at predetermined angular intervals in the circumferential direction of the intermediate member 60.

Thread grooves may be formed in the outer circumferential surface of the small diameter cylindrical portion 26 and the inner circumferential surface of the engagement portion 61 of the intermediate member 60. The thread grooves of the small diameter cylindrical portion 26 are threaded to the thread grooves of the engagement portion 61 in such a manner that the front housing member 22 and the intermediate member 60 are coupled together.

The clearance 74 between the small diameter cylindrical portion 26 and the flange 70 may be omitted.

The wave washer 71 may be replaced by, for example, a nut.

The ball bearing 28 may be replaced by any other suitable type of bearing such as a tapered roller bearing.

The intermediate member 60 may be provided outside the large diameter cylindrical portion 25 of the front housing member 22, instead of outside the small diameter cylindrical portion 26.

The bottom 27 of the front housing member 22 may be formed as a body separate from the front housing member 22.

The hollow portion 65 does not necessarily have to be formed in the intermediate member 60 but may be omitted. In this case, the intermediate member 60, which has the thermal expansion coefficient lower than the thermal expansion coefficient of the front housing member 22, is provided between the front housing member 22 and the ball bearing 28. This relaxes the stress applied to the ball bearing 28 by the thermal expansion of the front housing member 22 in the radially outward direction.

The thermal expansion coefficient of the intermediate member 60 may be equal to or greater than the thermal expansion coefficient of the front housing member 22. However, in this case, the intermediate member 60 must have the hollow portion 65, which is located radially inward from the securing portion 62. This structure causes the hollow portion 65 to absorb the thermal expansion of the front housing member 22 in the radially outward direction. The stress applied to the ball bearing 28 by the thermal expansion of the front housing member 22 in the radially outward direction is thus relaxed.

The front housing member 22 may be connected to the pinion shaft 7, instead of to the propeller shaft 5.

The power transmitting device 6 does not necessarily have to be arranged between the propeller shaft 5 and the pinion shaft 7. The power transmitting device 6 may be provided between, for example, one of the left and right side gears of the rear differential 8 and the corresponding one of the rear axles, or between the input shaft and the output shaft of a transfer device.

The invention claimed is:

1. A power transmitting device comprising:
a first rotor having a cylindrical shape;

a second rotor having a shaft-like shape, the second rotor being provided inside the first rotor to be rotatable relative to and coaxial with the first rotor;

a clutch mechanism that selectively permits and shuts off transmission of torque between the first rotor and the second rotor, the power transmitting device being rotatably supported by a bearing arranged outside the first rotor; and a relaxation member provided between the first rotor and the bearing, the relaxation member relaxing a stress applied to the bearing in a radially outward direction by thermal expansion of the first rotor, wherein the relaxation member includes a securing portion provided in an outer circumferential portion of the relaxation member to which the bearing is secured, and an engagement portion provided at an inner circumferential portion of a first end of the relaxation member which engages a small diameter cylindrical portion of the first shaft, and wherein an axially extending, annular groove extending along an entire circumference of the relaxation member is formed between the engagement portion and the securing portion.

2. The power transmitting device according to claim 1, wherein the relaxation member is an intermediate member arranged between the first rotor and the bearing, the intermediate member having a thermal expansion coefficient lower than the thermal expansion coefficient of the first rotor.

3. The power transmitting device according to claim 2, wherein the relaxation member has a hollow portion located at a position radially inward from a portion of the power transmitting device supported by the bearing.

4. The power transmitting device according to claim 1, wherein the relaxation member includes a projection or a recess, the first rotor having on an outer circumferential surface a recess or a projection that is engageable with the projection or the recess of the relaxation member, and wherein engagement between the projection or the recess of the relaxation member and the recess or the projection of the first rotor couple the relaxation member to the first rotor in such a manner that the relaxation member rotates integrally with the first rotor.

5. The power transmitting device according to claim 4, wherein the engagement between the projection or the recess of the relaxation member and the recess or the projection of the first rotor is achieved by means of splines.

6. The power transmitting device according to claim 5, wherein the recess or the projection of one of the relaxation member and the first rotor is a spline inclined at a predetermined angle with respect to an axial direction.

7. The power transmitting device according to claim 1, wherein the relaxation member has a flange projecting in a radially inward direction, and wherein the power transmitting device further includes an elastic member that presses the relaxation member toward the first rotor along an axial direction at the flange.

8. The power transmitting device according to claim 7, wherein a clearance is provided between the flange and the first rotor in the axial direction.

9. The power transmitting device according to claim 1, wherein the relaxation member is formed of an iron-based metal.

10. The power transmitting device according to claim 1, wherein the first rotor has a large diameter cylindrical portion and the small diameter cylindrical portion having a diameter smaller than the diameter of the large diameter cylindrical portion, and wherein the relaxation member is arranged outside the small diameter cylindrical portion.

11. The power transmitting device according to claim 1, wherein a slidable contact portion is provided in an outer circumferential portion of a second end of the relaxation member which slidably contacts a lip seal fixed to an inner circumferential surface of a coupling case in which the power transmitting device is rotatably received.

12. A power transmitting device comprising:
a first rotor having a cylindrical shape;
a second rotor having a shaft-like shape, the second rotor being provided inside the first rotor to be rotatable relative to and coaxial with the first rotor;
a clutch mechanism that selectively permits and shuts off transmission of torque between the first rotor and the second rotor, the power transmitting device being rotatably supported by a bearing arranged outside the first rotor; and
a relaxation member provided between the first rotor and the bearing, the relaxation member relaxing a stress applied to the bearing in a radially outward direction by thermal expansion of the first rotor,
wherein the relaxation member has a hollow portion located at a position radially inward from a portion of the power transmitting device supported by the bearing.

* * * * *